United States Patent
Hahn

(10) Patent No.: US 10,820,245 B2
(45) Date of Patent: *Oct. 27, 2020

(54) METHOD AND APPARATUS FOR LOAD DISTRIBUTION USING HETEROGENEOUS RADIO ACCESS TECHNOLOGIES IN COMMUNICATION SYSTEM SUPPORTING VEHICLE-TO-EVERYTHING COMMUNICATION

(71) Applicants: Hyundai Motor Company, Seoul (KR); Kia Motors Corporation, Seoul (KR)

(72) Inventor: Gene Beck Hahn, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/457,080

(22) Filed: Jun. 28, 2019

(65) Prior Publication Data
US 2019/0327587 A1   Oct. 24, 2019

Related U.S. Application Data

(63) Continuation of application No. 16/032,597, filed on Jul. 11, 2018, now Pat. No. 10,383,023.
(Continued)

(30) Foreign Application Priority Data

May 16, 2018 (KR) ........................ 10-2018-0056085

(51) Int. Cl.
*H04W 4/40* (2018.01)
*H04W 36/22* (2009.01)
(Continued)

(52) U.S. Cl.
CPC ............ *H04W 36/22* (2013.01); *H04W 4/40* (2018.02); *H04W 36/0016* (2013.01);
(Continued)

(58) Field of Classification Search
CPC ..................................................... H04W 36/22
See application file for complete search history.

(56) References Cited

U.S. PATENT DOCUMENTS

2015/0003254 A1   1/2015   Sasaki et al.
2017/0019887 A1   1/2017   Jiang et al.
(Continued)

*Primary Examiner* — Michael T Vu
(74) *Attorney, Agent, or Firm* — Mintz Levin Cohn Ferris Glovsky and Popeo, P.C.; Peter F. Corless

(57) ABSTRACT

An operation method of a first communication node located in a vehicle may include: performing V2X communication with a second communication node using an original resource according to an original SPS configuration; when a congestion level in the original resource is not less than a predetermined threshold and at least one target base station supporting V2X communication is discovered, generating new SPS configuration to be applied to the serving base station and the at least one target base station by changing original SPS configuration; performing a message transmission and reception procedure with the at least one target base station for delivery of new SPS configuration; and performing V2X communication with the second communication node using first resource scheduled by the serving base station based on new SPS configuration and second resource scheduled by the at least one target base station based on new SPS configuration.

31 Claims, 8 Drawing Sheets

Related U.S. Application Data

(60) Provisional application No. 62/628,600, filed on Feb. 9, 2018.

(51) Int. Cl.
*H04W 36/08* (2009.01)
*H04W 36/00* (2009.01)
*H04W 76/27* (2018.01)
*H04W 76/15* (2018.01)
*H04W 76/14* (2018.01)

(52) U.S. Cl.
CPC ....... *H04W 36/0066* (2013.01); *H04W 36/08* (2013.01); *H04W 76/15* (2018.02); *H04W 76/27* (2018.02); *H04W 76/14* (2018.02)

(56) References Cited

U.S. PATENT DOCUMENTS

| | | |
|---|---|---|
| 2017/0215119 A1 | 7/2017 | Hong et al. |
| 2017/0289986 A1 | 10/2017 | Jin et al. |
| 2018/0049073 A1* | 2/2018 | Dinan .................... H04W 36/08 |
| 2018/0049224 A1 | 2/2018 | Dinan et al. |
| 2018/0103460 A1* | 4/2018 | Sharma ............... H04W 72/042 |

* cited by examiner

METHOD AND APPARATUS FOR LOAD DISTRIBUTION USING HETEROGENEOUS RADIO ACCESS TECHNOLOGIES IN COMMUNICATION SYSTEM SUPPORTING VEHICLE-TO-EVERYTHING COMMUNICATION

CROSS-REFERENCE TO RELATED APPLICATIONS

This application is a continuation to U.S. patent application Ser. No. 16/052,597, filed on Jul. 11, 2018 claims the benefit of priority to U.S. Provisional Patent Application 62/628,600, filed on Feb. 9, 2018 in the U.S. Patent and Trademark Office, and Korean Patent Application No. 10-2018-0056085, filed on May 16, 2018 in the Korean Intellectual Property Office (KIPO), the entire contents of which are incorporated herein by reference.

BACKGROUND

1. Technical Field

The present disclosure relates generally to vehicle-to-everything (V2X) communication, and more specifically, to a method and an apparatus for load distribution using heterogeneous radio access technologies (RATs).

2. Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system such as the 4G communication system, the 5G communication system, and the like may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on "sidelink" communication technologies (e.g., Proximity based Services (ProSe) communication technology, Device-to-Device (D2D) communication technology, or the like). For example, sidelink channels for vehicles participating in V2V communications can be established, and communications between the vehicles can be performed using the sidelink channels.

In a cellular communication system supporting V2X communications (e.g., C-V2X communications), a vehicle, in which a communication node is disposed, may use a carrier configured based on a semi-persistent scheduling (SPS) scheme to communicate with a communication node (e.g., a communication node located in another vehicle, a communication node located in the infrastructure, or a communication node carried by a person). However, in a case that a load of the carrier configured based on the SPS scheme increases, data of the vehicle, often having high reliability and low latency requirements, such as Decentralized Environment Notification Message (DENM), Cooperative Awareness Message (CAM), and the like, may not be successfully transmitted or received. In this case, serious problems may occur due to a communication failure of the vehicle.

SUMMARY

Accordingly, embodiments of the present disclosure provide a method and an apparatus for load distribution using heterogeneous RATs when a Semi-Persistent Scheduling (SPS) scheme is used in a communication system supporting V2X communications.

According to embodiments of the present disclosure, an operation method of a first communication node located in a vehicle, in a communication system supporting Vehicle-to-Everything (V2X) communication can include: performing V2X communication with a second communication node using an original resource according to an original Semi-Persistent Scheduling (SPS) configuration set by a serving base station; when a congestion level in the original resource is greater than or equal to a predetermined threshold and at least one target base station supporting the V2X communication is discovered, generating a new SPS configuration to be applied to the serving base station and the at least one target base station by changing the original SPS configuration; performing a message transmission and reception procedure with the at least one target base station for delivery of the new SPS configuration; and performing the V2X communication with the second communication node using a first resource scheduled by the serving base station based on the new SPS configuration and a second resource scheduled by the at least one target base station based on the new SPS configuration.

The performing of the message transmission and reception procedure may comprise transmitting, to the at least one target base station, a radio resource control (RRC) connection request message requesting a connection for applying the new SPS configuration; receiving an RRC connection setup message from the at least one target base station, the RRC connection setup message being a response to the RRC connection request message; transmitting an RRC connection setup complete message including an identifier of the serving base station and the new SPS configuration to the at least one target base station when a connection establishment between the first communication node and the at least one target base station is completed; and receiving, from the at least one target base station, an RRC connection reconfiguration message indicating an application of the new SPS configuration.

The performing of the message transmission and reception procedure may comprise transmitting, to the at least one target base station, user equipment (UE) assistance information including an indicator requesting an application of the new SPS configuration, an identifier of the serving base station, and the new SPS configuration; and receiving, from the at least one target base station, an RRC connection reconfiguration message indicating the application of the new SPS configuration.

The operation method may further comprise transmitting, to the serving base station, UE assistance information including at least one identifier of the at least one target base station and the new SPS configuration.

The V2X communication using the first resource and the second resource based on the new SPS configuration may be performed when a message requesting application of the new SPS configuration is received from the serving base station and the at least one target base station.

A radio access technology (RAT) supported by the serving base station may be different from a RAT supported by the at least one target base station.

When a sum of a number of serving base stations and a number of the at least one target base station is N and a transmission interval of the original SPS configuration is T transmission time intervals (TTIs), a transmission interval of the new SPS configuration may be set to N×T TTIs, N being an integer greater than or equal to 2, and T being an integer greater than or equal to 1.

An offset between transmission intervals of the N base stations may be set to T TTIs in the new SPS configuration.

When a sum of a number of serving base stations and a number of the at least one target base station is N and a transmission interval of the original SPS configuration is T TTIs, a transmission interval of the new SPS configuration may be set to T TTIs, a size of data to be transmitted through each of the N base stations in the new SPS configuration may equal (a size of total data to be transmitted to the second communication node)/N, N being an integer greater than or equal to 2, and T being an integer greater than or equal to 1.

When a sum of a number of serving base stations and a number of the at least one target base station is N and a transmission interval of the original SPS configuration is T TTIs, a transmission interval of the new SPS configuration may be set to T TTIs, a size of data to be transmitted through each of the N base stations in the new SPS configuration may be inversely proportional to a channel congestion of each of the N base stations, N being an integer greater than or equal to 2, and T being an integer greater than or equal to 1.

Furthermore, in accordance with embodiments of the present disclosure, an operation method of a first communication node located in a vehicle, in a communication system supporting Vehicle-to-Everything (V2X) communication can include: performing V2X communication with a second communication node using an original resource according to an original Semi-Persistent Scheduling (SPS) configuration set by a serving base station; when a congestion level in the original resource is greater than or equal to a predetermined threshold and at least one target base station supporting the V2X communication is discovered, transmitting user equipment (UE) assistance information including at least one identifier of the at least one target base station to the serving base station; receiving, from the serving base station, a message including a new SPS configuration to be applied to the serving base station and the at least one target base station; performing a message transmission and reception procedure with the at least one target base station for delivery of the new SPS configuration; and performing the V2X communication with the second communication node using a first resource scheduled by the serving base station based on the new SPS configuration and a second resource scheduled by the at least one target base station based on the new SPS configuration.

The UE assistance information may further include an indicator requesting load distribution using the at least one target base station.

The message including a new SPS configuration may be a radio resource control (RRC) connection reconfiguration message.

The performing of the message transmission and reception procedure may include transmitting, to the at least one target base station, an RRC connection request message requesting a connection for applying the new SPS configuration; receiving an RRC connection setup message from the at least one target base station, the RRC connection setup message being a response to the RRC connection request message; transmitting an RRC connection setup complete message including an identifier of the serving base station and the new SPS configuration to the at least one target base station when a connection establishment between the first communication node and the at least one target base station is completed; and receiving, from the at least one target base station, an RRC connection reconfiguration message indicating an application of the new SPS configuration.

The performing of the message transmission and reception procedure may f include transmitting, to the at least one target base station, UE assistance information including an indicator requesting application of the new SPS configuration, an identifier of the serving base station, and the new SPS configuration; and receiving, from the at least one target base station, an RRC connection reconfiguration message indicating an application of the new SPS configuration.

A radio access technology (RAT) supported by the serving base station may be different from a RAT supported by the at least one target base station.

When a sum of a number of serving base stations and a number of the at least one target base station is N and a transmission interval of the original SPS configuration is T transmission time intervals (TTIs), a transmission interval of the new SPS configuration may be set to N×T TTIs, N being an integer greater than or equal to 2, and T being an integer greater than or equal to 1.

An offset between transmission intervals of the N base stations may be set to T TTIs in the new SPS configuration.

When a sum of a number of serving base stations and a number of the at least one target base station is N and a transmission interval of the original SPS configuration is T TTIs, a transmission interval of the new SPS configuration may be set to T TTIs, a size of data to be transmitted through each of the N base stations in the new SPS configuration may equal (a size of total data to be transmitted to the second communication node)/N, N being an integer greater than or equal to 2, and T being an integer greater than or equal to 1.

When a sum of a number of serving base stations and a number of the at least one target base station is N and a transmission interval of the original SPS configuration is T TTIs, a transmission interval of the new SPS configuration may be set to T TTIs, a size of data to be transmitted through each of the N base stations in the new SPS configuration may be inversely proportional to a channel congestion of each of the N base stations, N being an integer greater than or equal to 2, and T being an integer greater than or equal to 1.

According to the embodiments of the present disclosure, when a SPS scheme is used in a communication system supporting V2X communications, a SPS configuration can be changed based on CBRs measured by a vehicle, and V2X communication can be performed through resources allocated by a plurality of base stations (e.g., a plurality of base stations supporting different RATs) to which the changed SPS configuration is applied. That is, when a load on a resource configured by a base station supporting a first RAT (e.g., 4G communication technology) suddenly increase, the load can be distributed through a base station supporting a second RAT (e.g., 5G communication technology). Accordingly, messages having high reliability and low latency requirements such as Decentralized Environment Notification Message (DENM), Cooperative Awareness Message (CAM), messages for platooning services, messages for advanced driving services, messages for extended sensor services, messages for remote driving services, and the like can be successfully transmitted and received. Therefore, quality of service (QoS) for the V2X communications can be enhanced, and the performance of the communication system can be improved.

BRIEF DESCRIPTION OF DRAWINGS

Embodiments of the present disclosure will become more apparent by describing in detail embodiments of the present disclosure with reference to the accompanying drawings, in which.

Figure 1:
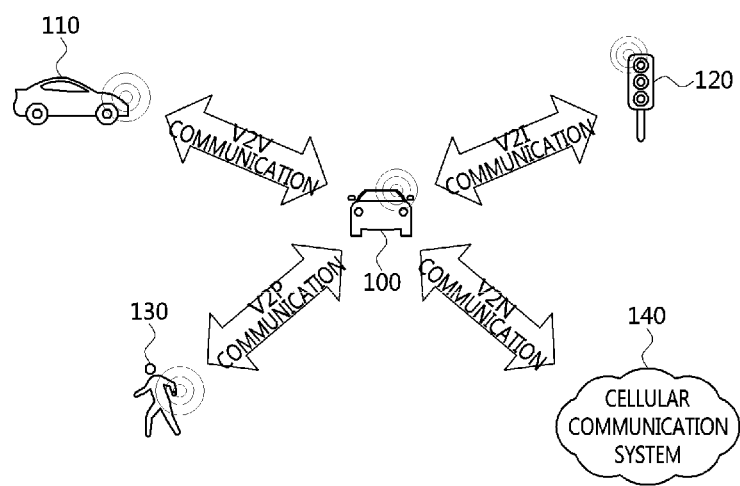
FIG. 1 is a conceptual diagram illustrating V2X communication scenarios.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus (e.g., communication node) comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on sidelink communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also be a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may include communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
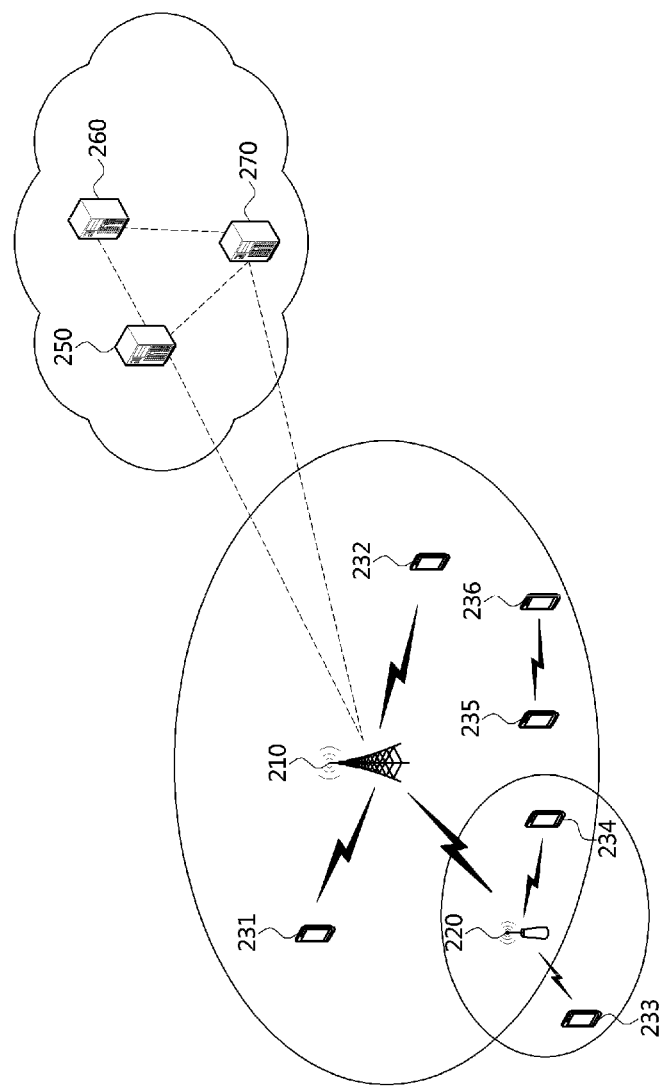
FIG. 2 is a conceptual diagram illustrating embodiments of a cellular communication system.

FIG. 2 is a conceptual diagram illustrating embodiments of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

Also, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
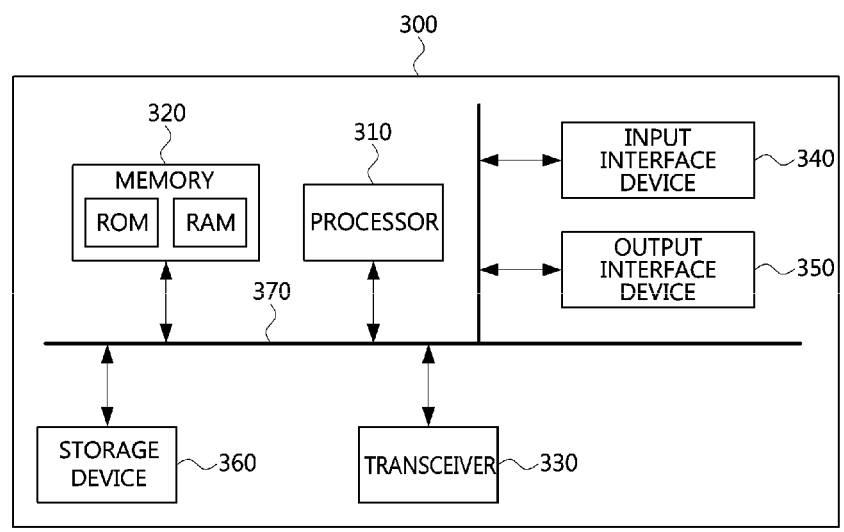
FIG. 3 is a conceptual diagram illustrating embodiments of a communication node constituting a cellular communication system.

FIG. 3 is a conceptual diagram illustrating embodiments of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input multiple-output (MIMO) technologies (e.g., single user (SU)-MIMO, multi user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
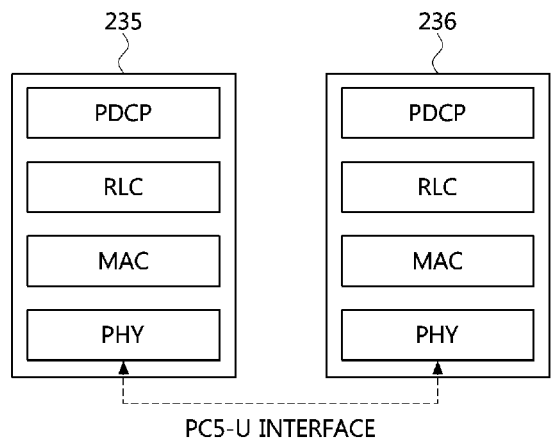
FIG. 4 is a block diagram illustrating embodiments of a user plane protocol stack of an UE performing sidelink communication.

FIG. 4 is a block diagram illustrating embodiments of a user plane protocol stack of an UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications. Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
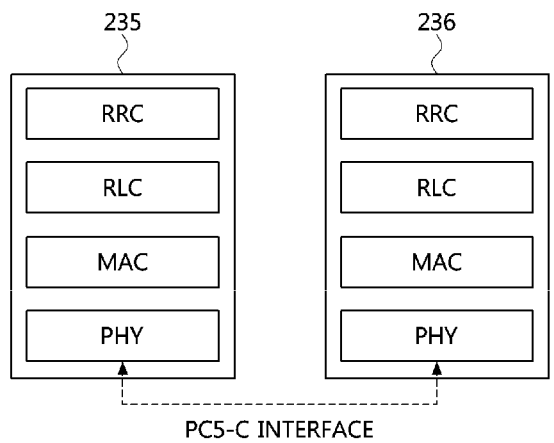
FIG. 5 is a block diagram illustrating a first embodiment of a control plane protocol stack of an UE performing sidelink communication.
Figure 6:
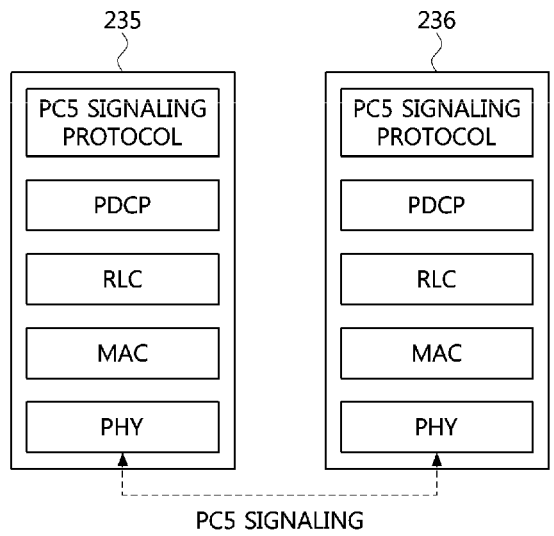
FIG. 6 is a block diagram illustrating a second embodiment of a control plane protocol stack of an UE performing sidelink communication.

FIG. 5 is a block diagram illustrating a first embodiment of a control plane protocol stack of an UE performing sidelink communication, and FIG. 6 is a block diagram illustrating a second embodiment of a control plane protocol stack of an UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and/or a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236.

Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, methods for load distribution using a plurality of carriers (e.g., a plurality of channels) in the communication system (e.g., the cellular communication system) supporting V2X communications as described above will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of the vehicle 100 is described, the corresponding vehicle 110 may perform an operation corresponding to the operation of the vehicle 100. Conversely, when an operation of the vehicle 110 is described, the corresponding vehicle 100 may perform an operation corresponding to the operation of the vehicle 110. In the embodiments described below, the operation of the vehicle may be the operation of the communication node located in the vehicle.

In the communication system supporting V2X communications, the vehicle may perform communications based on the CA scheme. For example, the vehicle may perform communications using a primary carrier and one or more secondary carriers. The carrier used for the V2X communications may be determined based on channel state information (e.g., Channel Busy Ratio (CBR)). The CBR may indicate congestion, occupancy state, load state, etc. of the corresponding carrier (e.g., channel). In this case, the vehicle may measure the CBR in the carrier according to a periodic or specific event, and may transmit the measured CBR to the base station. The base station may identify a channel congestion (e.g., occupancy state, load state) based on the CBR measured by the vehicle, and determine resources (e.g., carrier, resource pool) to be allocated to the vehicle based on the measured channel congestion.

When the sidelink TM 3 is used, the base station may configure time-frequency resources used for data transmission and may inform the vehicle of information on the configured time-frequency resources (i.e., scheduling information). Also, the base station may allocate time-frequency resources based on a semi-persistent scheduling (SPS) scheme. For example, the base station may configure up to eight SPS configurations having different parameters, and may transmit an SPS configuration activation message or an SPS deactivation request message to the vehicle through a signaling procedure.

The SPS configuration may be configured based on UE assistance information received from the vehicle. The UE assistance information may include traffic characteristic parameters, and the traffic characteristic parameters may include a set of preferred or expected SPS intervals, a timing offset associated with a subframe #0 within a system frame of a system frame number (SFN) #0, a ProSe Per-Packet Priority (PPPP), a maximum Transport Block Size (TBS) according to a traffic pattern, or the like.

When the sidelink TM 4 is used, the base station may configure the resource pool used for data transmission and may inform the vehicle of information on the configured resource pool. In this case, the vehicle may select a time-frequency resource that is not used by other communication nodes through channel sensing in the resource pool, and may perform communications using the selected time-frequency resource. For example, the time-frequency resource may be selected based on a distributed congestion control scheme. Also, the vehicle may adjust transmission parameters (e.g., a maximum transmission power, a range of retransmission counts per transport block (TB), etc.) based on the CBR, and perform communications using the adjusted transmission parameters. When the sidelink TM 4 is used, a vehicle located outside the coverage of the base station may also perform communications using time-frequency resources in a resource pool pre-configured by the base station.

However, when the sidelink TM 3 and the SPS scheme are used, when a load on the carrier on which the SPS configuration is activated increases, data of the vehicle (e.g., data having high reliability and low latency requirements, DENM, CAM, etc.) may not be successfully transmitted or received. Also, a transmission latency of the data may increase, and thus a requested quality of service (QoS) may not be satisfied. The load distribution methods to solve this problem may be as follows.

Figure 7:
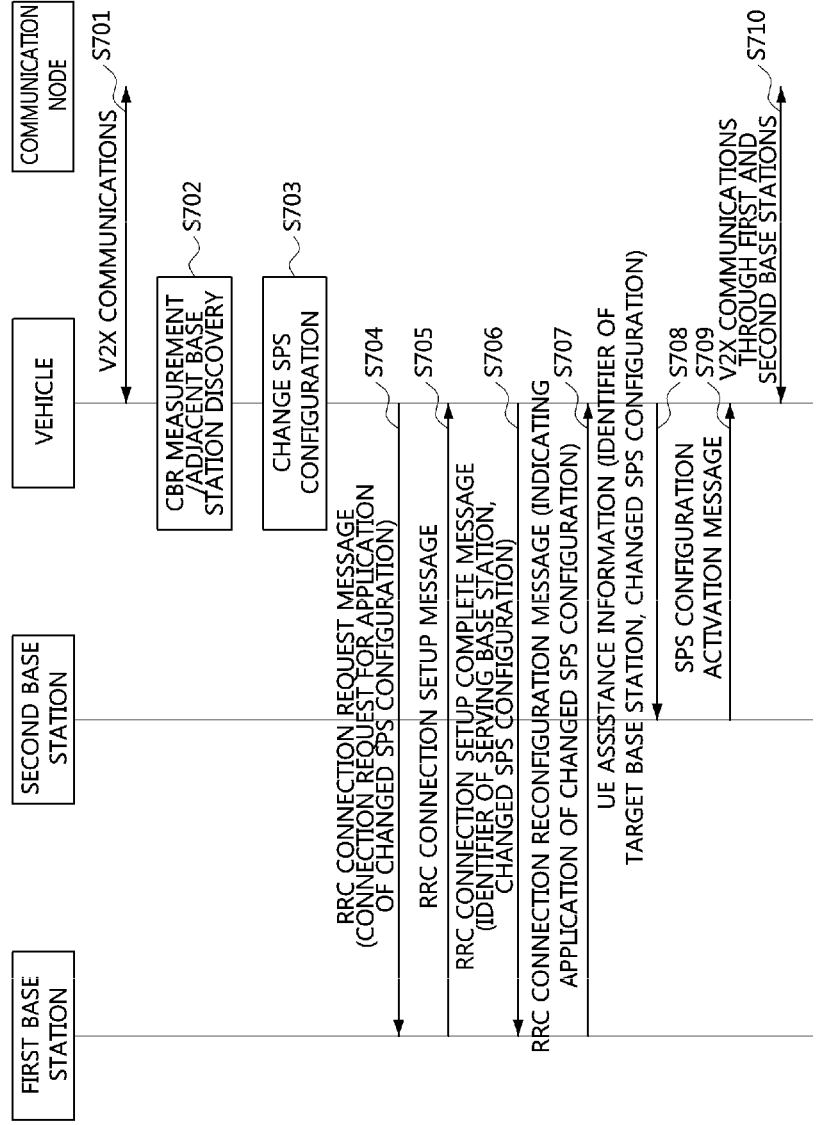
FIG. 7 is a sequence chart illustrating a first embodiment of a load distribution method using heterogeneous RATs.

FIG. 7 is a sequence chart illustrating a first embodiment of a load distribution method using heterogeneous RATs.

As shown in FIG. 7, a communication system supporting V2X communications may include a vehicle, a communication node equipped in the vehicle, a first base station, a second base station, and the like. For example, the vehicle of FIG. 7 may be the vehicle 100 of FIG. 1, and the communication node of FIG. 7 may be the communication node located in the vehicle 110 of FIG. 1, the communication node located in the infrastructure 120, or the communication node carried by the person 130. Each of the first and second base stations in FIG. 7 may be a base station belonging to the cellular communication system 140 of FIG. 1. Also, although each of the first and second base stations illustratively exists as a single base station in FIG. 7 and description below, there may be one or more first base stations and one or more second base stations.

The first and second base stations may support different RATs. For example, when the first base station supports a 4G communication technology, the second base station may support a 5G communication technology. Alternatively, when the first base station supports a 5G communication technology, the second base station may support a 4G communication technology. The V2X communications supported by the first and second base stations may be performed based on the sidelink TM 3 and the SPS scheme. Also the vehicle, the communication node, and the first and second base stations in FIG. 7 may support the sidelink TM 4 as well as the sidelink TM 3.

The vehicle may perform V2X communications with the communication node based on the SPS configuration set by the second base station (i.e., serving base station that is currently serving the vehicle) (S701). Here, the V2X communications may be performed using one or more carriers. The vehicle may measure channel states (e.g., CBRs) for the one or more carriers on which the V2X communications are performed (S702). Also, the vehicle may measure channel states of all the carriers configured for the vehicle as well as the one or more carriers on which the V2X communications are performed. That is, the vehicle may measure CBRs for all the aggregated carriers (e.g., all carriers to which the CA scheme is applied). The CBR measurement may be performed periodically or when a specific event (e.g., a request from the second base station) occurs. The vehicle may compare the measured CBR with a predetermined threshold value and determine that an overload has occurred in the corresponding carrier if the measured CBR is greater than or equal to the predetermined threshold value.

Also, in the step S702, the vehicle may discover at least one adjacent base station. The at least one adjacent base station may be a target base station to share the load of the second base station. For example, the vehicle may receive a synchronization signal (e.g., a Primary Synchronization Signal (PSS) and a Secondary Synchronization Signal (SSS), or a Synchronization Signal (SS) block (SSB)) from the first base station (i.e., the target base station), identify downlink timing of the first base station based on the synchronization signal, and receive system information of the first base station based on the downlink timing. The vehicle may identify uplink timing of the first base station by performing a random access procedure with the first base station using resources indicated by the system information.

When an overload occurs in the carrier configured by the second base station and the first base station is discovered, the vehicle may change a SPS configuration (e.g., an original SPS configuration) used for the V2X communications in the step S701 (S703). However, when the SPS configuration used for the V2X communications (e.g., the V2X communications supported by the second base station) in the step S710 is applied equally to the V2X communications supported by the first base station, the step S703 may be omitted.

In the step S703, the SPS configuration may be changed based on the number of adjacent base stations (e.g., target base stations) determined in the step S702. The step S703 may be performed based on a SPS configuration change scheme 1, 2 or 3.

SPS Configuration Change Scheme 1

When a sum of the number of at least one serving base station (e.g., the number of the second base stations) and the number of at least one target base station (e.g., the number of the first base stations) is N, and a data transmission interval in the SPS configuration supported by the at least one serving base station is T transmission time intervals (TTIs), the vehicle may set a data transmission interval to N×T TTIs in a new SPS configuration (i.e., a reconfigured SPS configuration) for the N base stations, and set an offset between data transmission intervals of the N base stations to T TTIs. For example, when N is 2 and T is 5, the data transmission interval in each of two base stations (e.g., serving base station and target base station) may be set to 10 TTIs, and an offset between data transmission intervals of the two base stations may be set to 5 TTIs. When a radio frame is composed of subframes 0 to 9, the V2X communications supported by the serving base station may be performed using the subframe 0, and the V2X communications supported by the target base station may be performed using the subframe 5.

SPS Configuration Change Scheme 2

When a sum of the number of at least one serving base station (e.g., the number of the second base stations) and the number of at least one target base station (e.g., the number of the first base stations) is N, and a data transmission interval in the SPS configuration supported by the at least one serving base station is T TTIs, the vehicle may maintain the data transmission interval to be T TTIs in the N base stations, set an offset between data transmission intervals of the N base stations to M TTIs (M is an integer greater than or equal to 0), and set a size of data transmitted through each of the N base stations to (a size of total data to be transmitted to the communication node)/N. That is, data of the same size may be transmitted in each of the N base stations.

For example, when N is 2, T is 5, M is 0, and the size of total data corresponds to 10 TBs, the data transmission interval in each of two base stations (e.g., serving base station and target base station) may be set to 5 TTIs, an offset between data transmission intervals of the two base stations may be set to 0 TTI, and the size of data transmitted in each of the two base stations may correspond to 5 TBs.

SPS Configuration Change Scheme 3

When a sum of the number of at least one serving base station (e.g., the number of the second base stations) and the number of at least one target base station (e.g., the number of the first base stations) is N, and a data transmission interval in the SPS configuration supported by the at least one serving base station is T TTIs, the vehicle may maintain the data transmission interval to be T TTIs in the N base stations, set an offset between data transmission intervals of the N base stations to M TTIs (M is an integer greater than or equal to 0), and set the size of data transmitted through each of the N base stations to be in inverse proportion to the CBR of each of the N base stations. That is, data can be distributed in consideration of channel congestion in each of the N base stations.

For example, when N is 2, T is 5, M is 0, the size of total data corresponds to 10 TBs, the CBR of the serving base station is 80%, and the CBR of the target base station is 20%, the data transmission interval in each of the two base stations may be set to 5 TTIs, an offset between the data transmission intervals of the two base stations may be set to 0 TTI, the size of data transmitted through resources allocated by the serving base station may correspond to 2 TBs, and the size of data transmitted through resources allocated by the target base station may correspond to 8 TB s.

When the step S703 is completed, the vehicle may transmit an RRC connection request message to the target base station (e.g., the first base station) to which the changed SPS configuration is to be applied (S704). The RRC connection request message may include an indicator requesting an RRC connection for performing V2X communications based on the changed SPS configuration. The first base station may receive the RRC connection request message from the vehicle and confirm that an RRC connection is requested for performing V2X communications according to the changed SPS configuration based on the received RRC connection request message. The first base station may transmit an RRC connection setup message to the vehicle in response to the RRC connection request message (S705).

The vehicle may receive the RRC connection setup message from the first base station and may perform an RRC connection establishment procedure with the first base station. When an RRC connection establishment between the vehicle and the first base station is completed, the vehicle may generate an RRC connection setup complete message including an identifier of the serving base station (e.g., the second base station), the changed SPS configuration, and the like. When the SPS configuration change scheme 1 is used, the RRC connection setup complete (e.g., the changed SPS configuration) may include the data transmission interval (N×T), the offset between data transmission intervals (T), and the like. When the SPS configuration change scheme 2 is used, the RRC connection setup complete message may include the data transmission interval (T), the offset between data transmission intervals (M), the size of data (i.e., data of the same size is transmitted in each base station) which can be transmitted through resources allocated by the target base station (e.g., the first base station), and the like. When the SPS configuration change scheme 3 is used, the RRC connection setup complete message (e.g., the changed SPS configuration) may include the data transmission interval (T), the offset between data transmission intervals (M), the size of data (i.e., the size of data is inversely proportional to the channel congestion of each base station) which can be transmitted through resources allocated by the target base station (e.g., the first base station), and the like.

The vehicle may transmit the RRC connection setup complete message to the first base station (S706). The first base station may receive the RRC connection setup complete message from the vehicle and may identify the information included in the received RRC connection setup complete message (e.g., the identifier of the serving base station (e.g., the second base station), the changed SPS configuration, the size of data, etc.). When the application of the changed SPS configuration is allowed, the first base station may transmit to the vehicle an RRC connection reconfiguration message including an indicator indicating that the application of the changed SPS configuration is allowed (S707). Also, an RRC connection reconfiguration message (e.g., an RRC connection reconfiguration message including the new SPS configuration (i.e., the changed SPS configuration) may be transmitted to the communication node performing V2X communications with the vehicle. The vehicle may receive the RRC connection reconfiguration message from the first base station and confirm that the application of the changed SPS configuration is allowed in the first base station based on the received RRC connection reconfiguration message.

Also, the vehicle may generate UE assistance information including the identifier of the target base station (e.g., the first base station) to which the changed SPS configuration is applied, the changed SPS configuration, and the like, and transmit the generated UE assistance information to the second base station (S708). Alternatively, in the step S708, sidelink UE information may be used instead of the UE assistance information. When the SPS configuration change scheme 1 is used, the UE assistance information (e.g., the changed SPS configuration) may include the data transmission interval (N×T), the offset between data transmission intervals (T), and the like. When the SPS configuration change scheme 2 is used, the UE assistance information may include the data transmission interval (T), the offset between data transmission intervals (M), the size of data (e.g., the size of data is the same in the base stations) which can be transmitted through resources allocated by the serving base station (e.g., the second base station), and the like. When the SPS configuration change scheme 3 is used, the UE assistance information (e.g., the changed SPS configuration) may include the data transmission interval (T), the offset between data transmission intervals (M), the size of data (e.g., the size of data is inversely proportional to the channel congestion of each base station) which can be transmitted through resources allocated by the serving base station (e.g., the second base station), and the like.

The second base station may receive the UE assistance information from the vehicle and may identify the information included in the received UE assistance information (e.g., the identifier of the target base station (e.g., the first base station), the changed SPS configuration, and the like). The second base station may schedule resources for V2X communications based on the information included in the UE assistance information. That is, the second base station may identify resources that are not scheduled by the SPS scheme according to the changed SPS configuration, and schedule resources for V2X communications of other vehicles using the identified resources.

Also, the base station may transmit to the vehicle an SPS configuration activation message indicating activation of the changed SPS configuration indicated by the UE assistance information (S709). The SPS configuration activation message may also be transmitted to the communication node. The vehicle may receive the SPS configuration activation message from the base station, and may perform V2X communications with the communication node using resources allocated by the first and second base stations according to the changed SPS configuration (S710). Alternatively, the vehicle may perform V2X communications with the communication node using resources allocated by the first and second base stations according to the changed SPS configuration without receiving the SPS configuration active message after transmission of the UE assistance information (S710).

Also, the changed SPS configuration (e.g., information on at least one adjacent base stations (i.e., target base station information; hereinafter, "adjacent base station information"), the data transmission interval, the offset between data transmission intervals, and the size of data that can be transmitted by each base station) used in the step S710 for the V2X communications between the vehicle and the communication node may be transmitted from the vehicle to the communication node before the step S710. For example, the vehicle may generate an SCI including the changed SPS configuration. When a SCI format 1 is used, the SCI format 1 may further include the changed SPS configuration, an application flag, and the like in addition to the existing information. In this case, the SCI format 1 may include information elements (IEs) shown below in Table 3.

TABLE 3

| IE | Description |
|---|---|
| MCS | Modulation and Coding Scheme (MCS) used for V2X communications |
| Priority | Priority of Transport Block (TB), which is configured by a higher layer signaling |
| Time Gap | Time gap between initial transmission and retransmission Frequency resource positions of initial transmission and retransmission |
| Resource reservation interval | Resource reservation interval in V2X communications |

TABLE 3-continued

| IE | Description |
| --- | --- |
| Changed SPS configuration | Information on adjacent base stations (identifiers of adjacent base stations, the number of adjacent base stations)<br>Data transmission interval<br>Offset between data transmission intervals<br>Size of data which can be transmitted by each base station |
| Application flag | Information indicating a time at which the changed SPS configuration is applied |

The application flag may be set to 0 or 1. The application flag set to 0 may indicate that the changed SPS configuration indicated by the SCI is applied after transmission of the corresponding SCI. The application flag set to 1 may indicate that the changed SPS configuration indicated by the SCI is applied from transmission of the corresponding SCI. Alternatively, a new SCI format may be defined that includes the changed SPS configuration and the application flag, and the vehicle may use the new SCI format to inform the communication node of the changed SPS configuration.

The vehicle may transmit the SCI (or, SCI+data) to the communication node. The communication node may receive the SCI from the vehicle, identify the changed SPS configuration included in the SCI, and identify a time point at which the changed SPS configuration is applied based on the application flag included in the SCI. Therefore, in the step S710, the vehicle and the communication node may perform V2X communications using the changed SPS configuration at the time indicated by the application flag.

Figure 8:
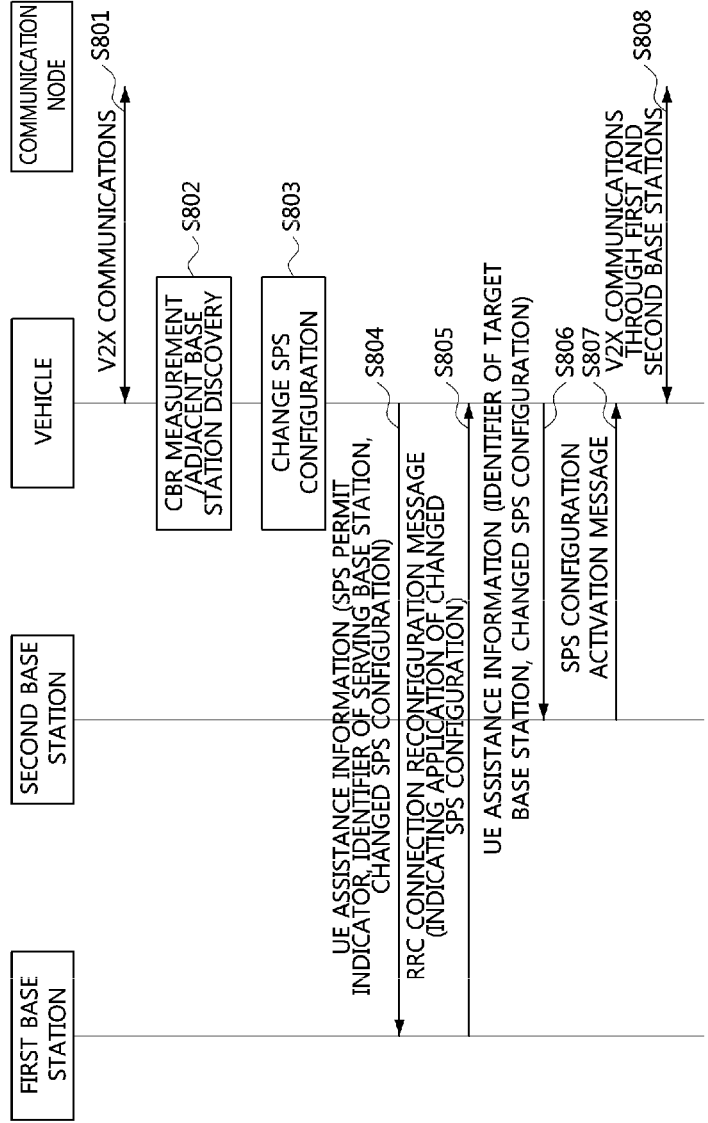
FIG. 8 is a sequence chart illustrating a second embodiment of a load distribution method using heterogeneous RATs.

FIG. 8 is a sequence chart illustrating a second embodiment of a load distribution method using heterogeneous RATs.

As shown in FIG. 8, a communication system supporting V2X communications may include a vehicle (e.g., a communication node located in the vehicle), a communication node, a first base station, a second base station, and the like. For example, the vehicle of FIG. 8 may be the vehicle 100 of FIG. 1, and the communication node of FIG. 8 may be the communication node located in the vehicle 110 of FIG. 1, the communication node located in the infrastructure 120, or the communication node carried by the person 130. Each of the first and second base stations in FIG. 8 may be a base station belonging to the cellular communication system 140 of FIG. 1. Also, although each of the first and second base stations illustratively exists as a single base station in FIG. 8 and description below, there may be one or more first base stations and one or more second base stations.

The first and second base stations may support different RATs. For example, when the first base station supports a 4G communication technology, the second base station may support a 5G communication technology. Alternatively, when the first base station supports a 5G communication technology, the second base station may support a 4G communication technology. The V2X communications supported by the first and second base stations may be performed based on the sidelink TM 3 and the SPS scheme. Also the vehicle, the communication node, and the first and second base stations in FIG. 8 may support the sidelink TM 4 as well as the sidelink TM 3.

The vehicle may perform V2X communications with the communication node based on the SPS configuration set by the second base station (e.g., serving base station that is currently serving the vehicle) (S801). Here, the V2X communications may be performed using one or more carriers. The vehicle may measure channel states (e.g., CBRs) for the one or more carriers on which the V2X communications are performed (S802). Also, the vehicle may measure channel states of all the carriers configured for the vehicle as well as the one or more carriers on which the V2X communications are performed. That is, the vehicle may measure CBRs for all the aggregated carriers (e.g., all carriers to which the CA scheme is applied). The CBR measurement may be performed periodically or when a specific event (e.g., a request from the second base station) occurs. The vehicle may compare the measured CBR with a predetermined threshold value and determine that an overload has occurred in the carrier if the measured CBR is greater than or equal to the predetermined threshold value.

Also, in the step S802, the vehicle may discover at least one adjacent base station. The at least one adjacent base station may be a target base station to share the load of the second base station. For example, the vehicle may receive a synchronization signal (e.g., a Primary Synchronization Signal (PSS) and a Secondary Synchronization Signal (SSS), or a Synchronization Signal (SS) block (SSB)) from the first base station (i.e., the target base station), identify downlink timing of the first base station based on the synchronization signal, and receive system information of the first base station based on the downlink timing. The vehicle may identify uplink timing of the first base station by performing a random access procedure with the first base station using resources indicated by the system information. Also, the vehicle may perform an RRC connection establishment procedure with the discovered first base station.

When an overload occurs in the carrier configured by the second base station and the first base station is discovered, the vehicle may change a SPS configuration (e.g., an original SPS configuration) used for the V2X communications in the step S801 (S803). However, when the SPS configuration used for the V2X communications (e.g., the V2X communications supported by the second base station) in the step S810 is applied equally to the V2X communications supported by the first base station, the step S803 may be omitted.

In the step S803, the SPS configuration may be changed based on the number of adjacent base stations (e.g., target base stations) determined in the step S802. The step S803 may be performed based on a SPS configuration change scheme 1, 2 or 3 described in the embodiment of FIG. 7. When the step S803 is completed, the vehicle may generate UE assistance information including an SPS permit indicator, the identifier of the serving base station (e.g., the second base station), the changed SPS configuration, and the like, and transmit the generated UE assistance information to the first base station (S804).

The SPS permit indicator may request the changed SPS configuration to be applied to the first base station. When the SPS configuration change scheme 1 is used, the UE assistance information (e.g., the changed SPS configuration) may include information on the data transmission interval (N×T), the offset between data transmission intervals (T), and the like. When the SPS configuration change scheme 2 is used, the UE assistance information (e.g., the changed SPS configuration) may include information on the data transmission interval (T), the offset between data transmission intervals (M), the size of data (i.e., the size of data is the same in all base stations) to be transmitted through resources allocated by the target base station (e.g., the first base station), and the like. When the SPS configuration change scheme 3 is used, the UE assistance information (e.g., the changed SPS configuration) may include information on the data transmission interval (T), the offset between data transmission intervals (M), the size of data (i.e., the size of data is inversely proportional to the channel congestion of each base station) to be transmitted through resources allocated by the target base station (e.g. the first base station), and the like.

The first base station may receive the UE assistance information from the vehicle, and identify information indicated by the received UE assistance information (e.g., the SPS permit indicator, the identifier of the serving base station (e.g., the second base station), the changed SPS configuration, the size of data, etc.). When the application of the changed SPS configuration is allowed, the first base station may transmit an RRC connection reconfiguration message to the vehicle by including an indicator indicating that the application of the changed SPS configuration is allowed in the RRC connection reconfiguration message (S805). Also, an RRC connection reconfiguration message (e.g., an RRC connection reconfiguration message including the new SPS configuration (i.e., the changed SPS configuration)) may be transmitted to the communication node performing V2X communications with the vehicle. The vehicle may receive the RRC connection reconfiguration message from the first base station and identify that the application of the changed SPS configuration is allowed in the first base station based on the received RRC connection reconfiguration message.

Also, the vehicle may generate UE assistance information including the identifier of the target base station (e.g., the first base station) to which the changed SPS configuration is applied, the changed SPS configuration, etc., and transmit the generated UE assistance information to the second base station (S806). Alternatively, in the step S806, sidelink UE information may be used instead of the UE assistance information. When the SPS configuration change scheme 1 is used, the UE assistance information (e.g., the changed SPS configuration) may include information on the data transmission interval (N×T), the offset between data transmission intervals (T), and the like. When the SPS configuration change scheme 2 is used, the UE assistance information (e.g., the changed SPS configuration) may include information on the data transmission interval (T), the offset between data transmission intervals (M), the size of data (i.e., the size of data is the same in all base stations) to be transmitted through resources allocated by the serving base station (e.g., the second base station), and the like. When the SPS configuration change scheme 3 is used, the UE assistance information (e.g., the changed SPS configuration) may include information on the data transmission interval (T), the offset between data transmission intervals (M), the size of data (i.e., the size of data is inversely proportional to the channel congestion of each base station) to be transmitted through resources allocated by the serving base station (e.g., the second base station), and the like.

The second base station may receive the UE assistance information from the vehicle, and identify information indicated by the received UE assistance information (e.g., the identifier of the target base station (e.g., the first base station), the changed SPS configuration, etc.). The second base station may schedule resources for V2X communications based on the information indicated by the UE assistance information. That is, the second base station may identify resources that are not scheduled by the SPS according to the changed SPS configuration, and may schedule resources for V2X communication of other vehicles using the identified resources.

Also, the base station may transmit, to the vehicle, an SPS configuration activation message indicating activation of the changed SPS configuration indicated by the UE assistance information (S807). The SPS configuration activation message may also be transmitted to the communication node. The vehicle may receive the SPS configuration activation message from the base station and may perform V2X communications with the communication node using the resources allocated by the first base station and the second base station according to the changed SPS configuration (S808). Alternatively, the vehicle may perform V2X communications with the communication node using the resources allocated by the first base station and the second base station according to the changed SPS configuration without receiving the SPS configuration activation message after transmission of the UE assistance information (S808).

Also, the changed SPS configuration used in the step S808 for the V2X communications between the vehicle and the communication node (e.g., the adjacent base station information, the data transmission interval, the offset between data transmission intervals, the size of data which can be transmitted through each base station) may be transmitted from the vehicle to the communication node before the step S808. For example, the vehicle may generate a SCI including information elements described in Table 3 (e.g., the changed SPS configuration, the application flag, etc.), and transmit the SCI (or, SCI+data) to the communication node. The communication node may receive the SCI from the vehicle, identify the changed SPS configuration included in the SCI, and identify the time point at which the changed SPS configuration is applied based on the application flag included in the SCI. Therefore, in the step S808, the vehicle and the communication node may perform V2X communications using the changed SPS configuration at the time indicated by the application flag.

Figure 9:
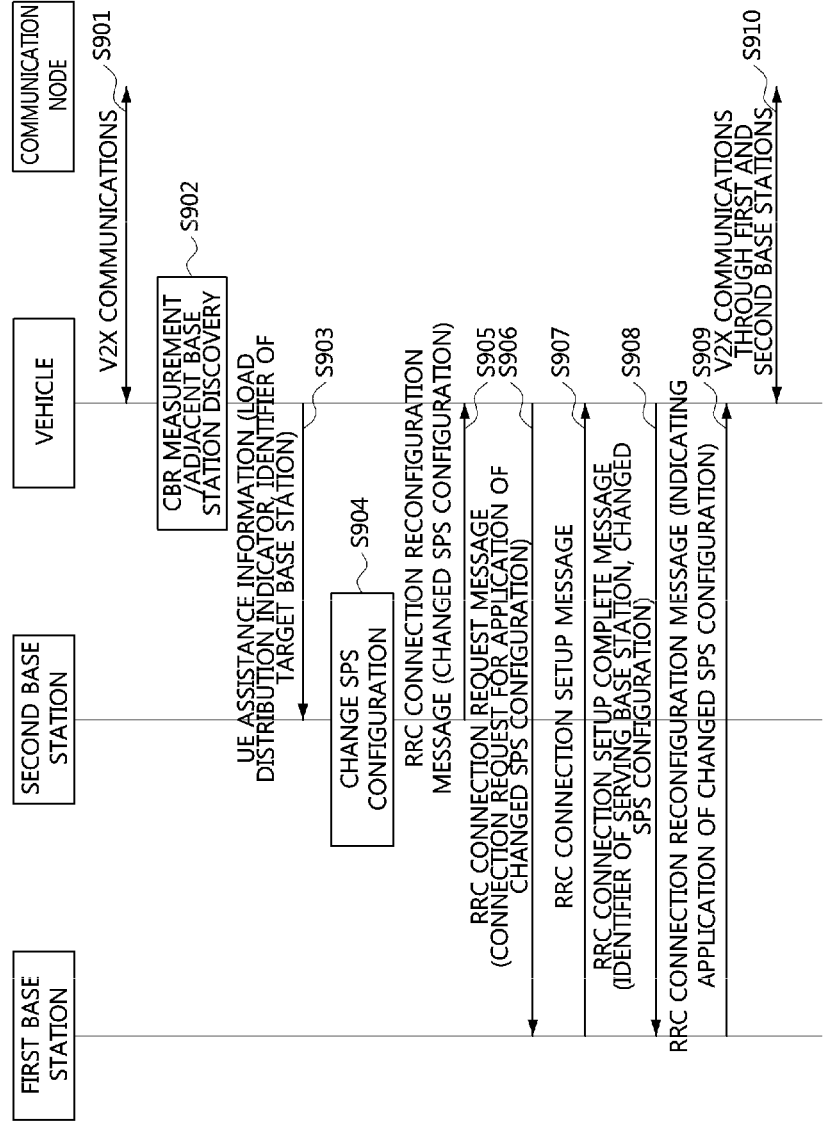
FIG. 9 is a sequence chart illustrating a third embodiment of a load distribution method using heterogeneous RATs.

FIG. 9 is a sequence chart illustrating a third embodiment of a load distribution method using heterogeneous RATs.

As shown in FIG. 9, a communication system supporting V2X communications may include a vehicle, a communication node equipped in the vehicle, a first base station, a second base station, and the like. For example, the vehicle of FIG. 9 may be the vehicle 100 of FIG. 1, and the communication node of FIG. 9 may be the communication node located in the vehicle 110 of FIG. 1, the communication node located in the infrastructure 120, or the communication node carried by the person 130. Each of the first and second base stations in FIG. 9 may be a base station belonging to the cellular communication system 140 of FIG. 1. Also, although each of the first and second base stations illustratively exists as a single base station in FIG. 9 and description below, there may be one or more first base stations and one or more second base stations.

The first and second base stations may support different RATs. For example, when the first base station supports a 4G communication technology, the second base station may support a 5G communication technology. Alternatively, when the first base station supports a 5G communication technology, the second base station may support a 4G communication technology. The V2X communications supported by the first and second base stations may be performed based on the sidelink TM 3 and the SPS scheme. Also the vehicle, the communication node, and the first and second base stations in FIG. 9 may support the sidelink TM 4 as well as the sidelink TM 3.

The vehicle may perform V2X communications with the communication node based on the SPS configuration set by the second base station (e.g., serving base station that is currently serving the vehicle) (S901). Here, the V2X communications may be performed using one or more carriers. The vehicle may measure channel states (e.g., CBRs) for the one or more carriers on which the V2X communications are performed (S902). Also, the vehicle may measure channel states of all the carriers configured for the vehicle as well as the one or more carriers on which the V2X communications are performed. That is, the vehicle may measure CBRs for all the aggregated carriers (e.g., all carriers to which the CA scheme is applied). The CBR measurement may be performed periodically or when a specific event (e.g., a request from the second base station) occurs. The vehicle may compare the measured CBR with a predetermined threshold value and determine that an overload has occurred in the carrier if the measured CBR is greater than or equal to the predetermined threshold value.

Also, in the step S902, the vehicle may discover at least one adjacent base station. The at least one adjacent base station may be a target base station to share the load of the second base station. For example, the vehicle may receive a synchronization signal (e.g., PSS and SSS, or SSB) from the first base station (i.e., the target base station), identify downlink timing of the first base station based on the synchronization signal, and receive system information of the first base station based on the downlink timing. The vehicle may identify uplink timing of the first base station by performing a random access procedure with the first base station using resources indicated by the system information.

When an overload occurs in the carrier configured by the second base station and the first base station is discovered, the vehicle may generate UE assistance information including a load distribution indicator, the identifier of the target base station (e.g., the first base station), etc., and transmit the generated UE assistance information to the second base station (S903). Alternatively, in the step S903, sidelink UE information may be used instead of the UE assistance information. The load distribution indicator may request load distribution through the target base station indicated by the UE assistance information. The second base station may receive the UE assistance information from the vehicle and identify the information included in the received UE assistance information (e.g., the load distribution indicator, the identifier of the target base station (e.g., the first base station)).

That is, the second base station may confirm that the load distribution through the first base station is requested based on the UE assistance information. In this case, the second base station may change the SPS configuration (e.g., the original SPS configuration) used for V2X communications in step S901 (S904). However, when the SPS configuration used in the step S901 for the V2X communications (e.g., V2X communications supported by the second base station) is applied to the V2X communication supported by the first base station, the step S904 may be omitted.

In the step S904, the SPS configuration (e.g., SPS parameters) may be changed based on the number of adjacent base stations (e.g., target base stations) determined in the step S902. The step S904 may be performed based on the SPS configuration change scheme 1, 2 or 3 described in the embodiment of FIG. 7. In the embodiment of FIG. 7, the SPS configuration change scheme 1, 2 or 3 is performed by the vehicle. However, in the embodiment of FIG. 9, the SPS configuration change scheme 1, 2 or 3 may be performed by the base station instead of the vehicle. That is, the operation of the base station performing the SPS configuration change scheme 1, 2 or 3 in the embodiment of FIG. 9 may be the same as the operation of the vehicle performing the SPS configuration change scheme 1, 2 or 3 in the embodiment of FIG. 7.

When the step S904 is completed, the second base station may transmit an RRC connection reconfiguration message including the changed SPS configuration to the vehicle (S905). The RRC connection reconfiguration message may also be transmitted to the communication node performing V2X communications with the vehicle. When the SPS configuration change scheme 1 is used, the RRC connection reconfiguration message (e.g., the changed SPS configuration) may include information on the data transmission interval (N×T), the offset between data transmission intervals (T), and the like. When the SPS configuration change scheme 2 is used, the RRC connection reconfiguration message (e.g., the changed SPS configuration) may include information on the data transmission interval (T), the offset between data transmission intervals (M), the size of data (i.e., the size of data is the same in all base stations) to be transmitted through resources allocated by the target base station (e.g., the first base station), and the like. When the SPS configuration change scheme 3 is used, the RRC connection reconfiguration message (e.g., the changed SPS configuration) may include information on the data transmission interval (T), the offset between data transmission intervals (M), the size of data (i.e., the size of data is inversely proportional to the channel congestion of each base station) to be transmitted through resources allocated by the target base station (e.g. the first base station), and the like. The vehicle may receive the RRC connection reconfiguration message from the second base station, and identify the changed SPS configuration included in the received RRC connection reconfiguration message.

When the step S905 is completed, the vehicle may transmit an RRC connection request message to the target base station (e.g., the first base station) to which the changed SPS configuration is to be applied (S906). The RRC connection request message may include an indicator requesting an RRC connection for performing V2X communications based on the changed SPS configuration. The first base station may receive the RRC connection request message from the vehicle and confirm that an RRC connection is requested for performing V2X communications according to the changed SPS configuration based on the received RRC connection request message. The first base station may transmit an RRC connection setup message to the vehicle in response to the RRC connection request message (S907).

The vehicle may receive the RRC connection setup message from the first base station and may perform an RRC connection establishment procedure with the first base station. When an RRC connection establishment between the vehicle and the first base station is completed, the vehicle may generate an RRC connection complete message including an identifier of the serving base station (e.g., the second base station), the changed SPS configuration, and the like. When the SPS configuration change scheme 1 is used, the RRC connection setup complete (e.g., the changed SPS configuration) may include the data transmission interval (N×T), the offset between data transmission intervals (T), and the like. When the SPS configuration change scheme 2 is used, the RRC connection setup complete message (e.g., the changed SPS configuration) may include the data transmission interval (T), the offset between data transmission intervals (M), the size of data (i.e., the size of data is the same in all base stations) which can be transmitted through resources allocated by the target base station (e.g., the first base station), and the like. When the SPS configuration change scheme 3 is used, the RRC connection setup complete message (e.g., the changed SPS configuration) may include the data transmission interval (T), the offset between data transmission intervals (M), the size of data (i.e., the size of data is inversely proportional to the channel congestion of each base station) which can be transmitted through resources allocated by the target base station (e.g., the first base station), and the like.

The vehicle may transmit an RRC connection setup complete message to the first base station (S908). The first base station may receive the RRC connection setup complete message from the vehicle and may identify the information included in the received RRC connection setup complete message (e.g., the identifier of the serving base station (e.g., the second base station), the changed SPS configuration, the size of data, etc.). When the application of the changed SPS configuration is allowed, the first base station may transmit to the vehicle an RRC connection reconfiguration message including an indicator indicating that the application of the changed SPS configuration is allowed (S909). Also, an RRC connection reconfiguration message (e.g., an RRC connection reconfiguration message including a new SPS configuration (i.e., the changed SPS configuration) may be transmitted to the communication node performing V2X communications with the vehicle. The vehicle may receive the RRC connection reconfiguration message from the first base station and confirm that the application of the changed SPS configuration is allowed in the first base station based on the received RRC connection reconfiguration message (S910).

Also, the changed SPS configuration used in the step S910 for the V2X communications between the vehicle and the communication node (e.g., information on adjacent base stations, the data transmission interval, the offset between data transmission intervals, the size of data which can be transmitted through each base station) may be transmitted from the vehicle to the communication node before the step S910. For example, the vehicle may generate a SCI including information elements described in Table 3 (e.g., the changed SPS configuration, the application flag, etc.), and transmit the SCI (or, SCI+data) to the communication node. The communication node may receive the SCI from the vehicle, identify the changed SPS configuration included in the SCI, and identify the time point at which the changed SPS configuration is applied based on the application flag included in the SCI. Therefore, in the step S910, the vehicle and the communication node may perform V2X communications using the changed SPS configuration at the time indicated by the application flag.

Figure 10:
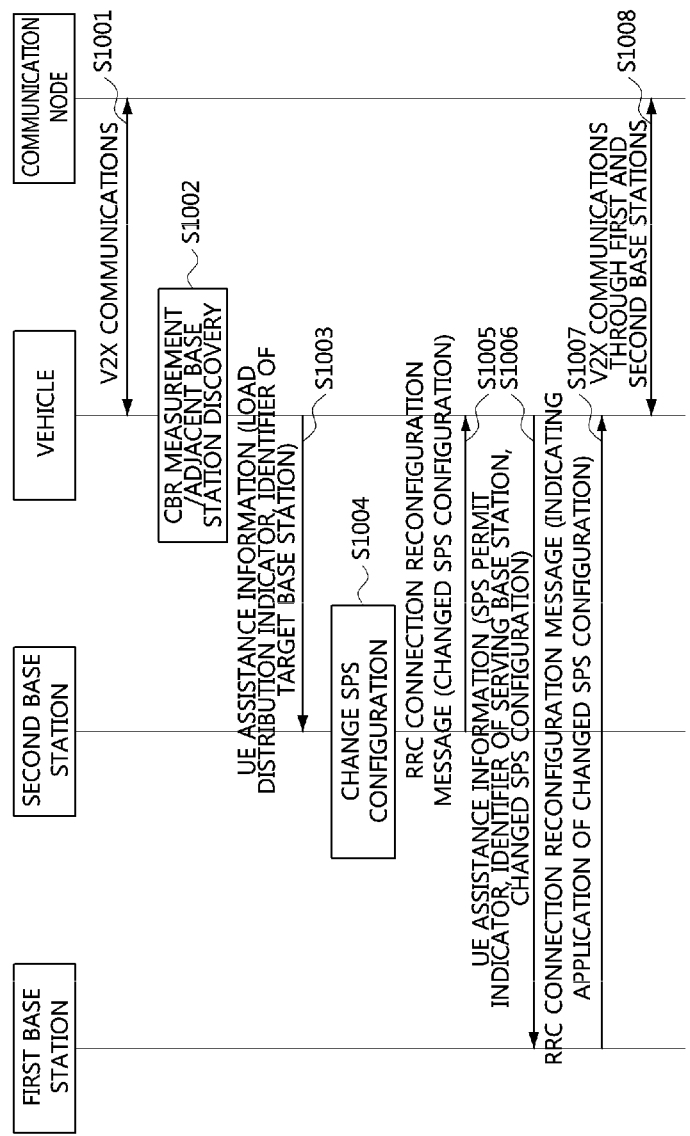
FIG. 10 is a sequence chart illustrating a fourth embodiment of a load distribution method using heterogeneous RATs.

FIG. 10 is a sequence chart illustrating a fourth embodiment of a load distribution method using heterogeneous RATs.

As shown in FIG. 10, a communication system supporting V2X communications may include a vehicle, a communication node equipped in the vehicle, a first base station, a second base station, and the like. For example, the vehicle of FIG. 10 may be the vehicle 100 of FIG. 1, and the communication node of FIG. 10 may be the communication node located in the vehicle 110 of FIG. 1, the communication node located in the infrastructure 120, or the communication node carried by the person 130. Each of the first and second base stations in FIG. 10 may be a base station belonging to the cellular communication system 140 of FIG. 1. Also, although each of the first and second base stations illustratively exists as a single base station in FIG. 10 and description below, there may be one or more first base stations and one or more second base stations.

The first and second base stations may support different RATs. For example, when the first base station supports a 4G communication technology, the second base station may support a 5G communication technology. Alternatively, when the first base station supports a 5G communication technology, the second base station may support a 4G communication technology. The V2X communications supported by the first and second base stations may be performed based on the sidelink TM 3 and the SPS scheme. Also the vehicle, the communication node, and the first and second base stations in FIG. 10 may support the sidelink TM 4 as well as the sidelink TM 3.

The vehicle may perform V2X communications with the communication node based on the SPS configuration set by the second base station (e.g., serving base station that is currently serving the vehicle) (S1001). Here, the V2X communications may be performed using one or more carriers. The vehicle may measure channel states (e.g., CBRs) for the one or more carriers on which the V2X communications are performed (S1002). Also, the vehicle may measure channel states of all the carriers configured for the vehicle as well as the one or more carriers on which the V2X communications are performed. That is, the vehicle may measure CBRs for all the aggregated carriers (e.g., all carriers to which the CA scheme is applied). The CBR measurement may be performed periodically or when a specific event (e.g., a request from the second base station) occurs. The vehicle may compare the measured CBR with a predetermined threshold value and determine that an overload has occurred in the carrier if the measured CBR is greater than or equal to the predetermined threshold value.

Also, in the step S1002, the vehicle may discover at least one adjacent base station. The at least one adjacent base station may be a target base station to share the load of the second base station. For example, the vehicle may receive a synchronization signal (e.g., PSS and SSS, or SSB) from the first base station (i.e., the target base station), identify downlink timing of the first base station based on the synchronization signal, and receive system information of the first base station based on the downlink timing. The vehicle may identify uplink timing of the first base station by performing a random access procedure with the first base station using resources indicated by the system information.

When an overload occurs in the carrier configured by the second base station and the first base station is discovered, the vehicle may generate UE assistance information including a load distribution indicator, the identifier of the target base station (e.g., the first base station), etc., and transmit the generated UE assistance information to the second base station (S1003). Alternatively, in the step S1003, sidelink UE information may be used instead of the UE assistance information. The load distribution indicator may request load distribution through the target base station indicated by the UE assistance information. The second base station may receive the UE assistance information from the vehicle and identify the information included in the received UE assistance information (e.g., the load distribution indicator, the identifier of the target base station (e.g., the first base station)).

That is, the second base station may confirm that the load distribution through the first base station is requested based on the UE assistance information. In this case, the second base station may change the SPS configuration (e.g., the original SPS configuration) used for V2X communications in step S1001 (S1004). However, when the SPS configuration used in the step S1001 for the V2X communications (e.g., V2X communications controlled by the second base station) is applied to the V2X communication controlled by the first base station, the step S1004 may be omitted.

In the step S1004, the SPS configuration (e.g., SPS parameters) may be changed based on the number of adjacent base stations (e.g., target base stations) determined in the step S1002. The step S1004 may be performed based on the SPS configuration change scheme 1, 2 or 3 described in the embodiment of FIG. 7. In the embodiment of FIG. 7, the SPS configuration change scheme 1, 2 or 3 are performed by the vehicle. However, in the embodiment of FIG. 10, the SPS configuration change scheme 1, 2 or 3 may be performed by the base station instead of the vehicle. That is, the operation of the base station performing the SPS configuration change scheme 1, 2 or 3 in the embodiment of FIG. 10 may be the same as the operation of the vehicle performing the SPS configuration change scheme 1, 2 or 3 in the embodiment of FIG. 7.

When the step S1004 is completed, the second base station may transmit an RRC connection reconfiguration message including the changed SPS configuration to the vehicle (S1005). The RRC connection reconfiguration message may also be transmitted to the communication node performing V2X communications with the vehicle. When the SPS configuration change scheme 1 is used, the RRC connection reconfiguration message (e.g., the changed SPS configuration) may include information on the data transmission interval (N×T), the offset between data transmission intervals (T), and the like. When the SPS configuration change scheme 2 is used, the RRC connection reconfiguration message (e.g., the changed SPS configuration) may include information on the data transmission interval (T), the offset between data transmission intervals (M), the size of data (i.e., the size of data is the same in all base stations) to be transmitted through a resource allocated by the target base station (e.g., the first base station), and the like. When the SPS configuration change scheme 3 is used, the RRC connection reconfiguration message (e.g., the changed SPS configuration) may include information on the data transmission interval (T), the offset between data transmission intervals (M), the size of data (i.e., the size of data is inversely proportional to the channel congestion of each base station) to be transmitted through a resource allocated by the target base station (e.g. the first base station), and the like. The vehicle may receive the RRC connection reconfiguration message from the second base station, and identify the changed SPS configuration included in the received RRC connection reconfiguration message.

When the step S1005 is completed, the vehicle may generate UE assistance information including an SPS permit indicator, the identifier of the serving base station (e.g., the second base station), the changed SPS configuration, and the like, and transmit the generated UE assistance information to the first base station (S1006). The SPS permit indicator may request the changed SPS configuration to be applied to the first base station. When the SPS configuration change scheme 1 is used, the UE assistance information (e.g., the changed SPS configuration) may include information on the data transmission interval (N×T), the offset between data transmission intervals (T), and the like. When the SPS configuration change scheme 2 is used, the UE assistance information (e.g., the changed SPS configuration) may include information on the data transmission interval (T), the offset between data transmission intervals (M), the size of data (i.e., the size of data is the same in all base stations) to be transmitted through a resource allocated by the target base station (e.g., the first base station), and the like. When the SPS configuration change scheme 3 is used, the UE assistance information (e.g., the changed SPS configuration) may include information on the data transmission interval (T), the offset between data transmission intervals (M), the size of data (i.e., the size of data is inversely proportional to the channel congestion of each base station) to be transmitted through a resource allocated by the target base station (e.g. the first base station), and the like.

The first base station may receive the UE assistance information from the vehicle, and identify information indicated by the received UE assistance information (e.g., the SPS permit indicator, the identifier of the serving base station (e.g., the second base station), the changed SPS configuration, the size of data, etc.). When the application of the changed SPS configuration is allowed, the first base station may transmit an RRC connection reconfiguration message to the vehicle by including an indicator indicating that the application of the changed SPS configuration is allowed in the RRC connection reconfiguration message (S1007). Also, the RRC connection reconfiguration message (e.g., an RRC connection reconfiguration message including the new SPS configuration (i.e., the changed SPS configuration) may be transmitted to the communication node performing V2X communications with the vehicle. The vehicle may receive the RRC connection reconfiguration message from the first base station and identify that the application of the changed SPS configuration is allowed in the first base station based on the received RRC connection reconfiguration message. Then, the vehicle may perform V2X communications with the communication node using resources allocated by the first base station and the second base station according to the changed SPS configuration (S1008).

Also, the changed SPS configuration used in the step S1008 for the V2X communications between the vehicle and the communication node (e.g., information on adjacent base stations, the data transmission interval, the offset between data transmission intervals, the size of data which can be transmitted through each base station) may be transmitted from the vehicle to the communication node before the step S1008. For example, the vehicle may generate a SCI including information elements described in Table 3 (e.g., the changed SPS configuration, the application flag, etc.), and transmit the SCI (or, the SCI+data) to the communication node. The communication node may receive the SCI from the vehicle, identify the changed SPS configuration included in the SCI, and identify the time point at which the changed SPS configuration is applied based on the application flag included in the SCI. Therefore, in the step S1008, the vehicle and the communication node may perform V2X communications using the changed SPS configuration at the time indicated by the application flag.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A first communication node located in a vehicle, in a communication system supporting Vehicle-to-Everything (V2X) communication, the first communication node comprising:
    processor;
    transceiver transmitting and receiving a signal according to control of the processor; and
    memory storing one or more instructions which are executed by the processor;
    wherein the one or more instructions are configured to:
    perform V2X communication with a second communication node using an original resource according to an original Semi-Persistent Scheduling (SPS) configuration set by a serving base station;
    when a congestion level in the original resource is greater than or equal to a predetermined threshold and at least one target base station supporting the V2X communication is discovered, generate a new SPS configuration to be applied to the serving base station and the at least one target base station by changing the original SPS configuration;
    perform a message transmission and reception procedure with the at least one target base station for delivery of the new SPS configuration; and
    perform the V2X communication with the second communication node using a first resource scheduled by the serving base station based on the new SPS configuration and a second resource scheduled by the at least one target base station based on the new SPS configuration.

2. The first communication node according to claim 1, wherein, in the message transmission and reception procedure, the one or more instructions are configured to:
    transmit, to the at least one target base station, a radio resource control (RRC) connection request message requesting a connection for applying the new SPS configuration;
    receive an RRC connection setup message from the at least one target base station, the RRC connection setup message being a response to the RRC connection request message;
    transmit an RRC connection setup complete message including an identifier of the serving base station and the new SPS configuration to the at least one target base station when a connection establishment between the first communication node and the at least one target base station is completed; and
    receive, from the at least one target base station, an RRC connection reconfiguration message indicating an application of the new SPS configuration.

3. The first communication node according to claim 1, wherein, in the message transmission and reception procedure, the one or more instructions are configured to:
    transmit, to the at least one target base station, user equipment (UE) assistance information including an indicator requesting an application of the new SPS configuration, an identifier of the serving base station, and the new SPS configuration; and
    receive, from the at least one target base station, an RRC connection reconfiguration message indicating the application of the new SPS configuration.

4. The first communication node according to claim 1, wherein the one or more instructions are further configured to:
    transmit, to the serving base station, UE assistance information including at least one identifier of the at least one target base station and the new SPS configuration.

5. The first communication node according to claim 1, wherein the V2X communication using the first resource and the second resource based on the new SPS configuration are performed when a message requesting application of the new SPS configuration is received from the serving base station and the at least one target base station.

6. The first communication node according to claim 1, wherein a radio access technology (RAT) supported by the serving base station is different from a RAT supported by the at least one target base station.

7. The first communication node according to claim 1, wherein, when a sum of a number of serving base stations and a number of the at least one target base station is N and a transmission interval of the original SPS configuration is T transmission time intervals (TTIs), a transmission interval of the new SPS configuration is set to N×T TTIs, N is an integer greater than or equal to 2, and T is an integer greater than or equal to 1.

8. The first communication node according to claim 7, wherein an offset between transmission intervals of the N base stations is set to T TTIs in the new SPS configuration.

9. The first communication node according to claim 1, wherein, when a sum of a number of serving base stations and a number of the at least one target base station is N and a transmission interval of the original SPS configuration is T TTIs, a transmission interval of the new SPS configuration is set to T TTIs, a size of data to be transmitted through each of the N base stations in the new SPS configuration equals (a size of total data to be transmitted to the second communication node)/N, N is an integer greater than or equal to 2, and T is an integer greater than or equal to 1.

10. The first communication node according to claim 1, wherein, when a sum of a number of serving base stations and a number of the at least one target base station is N and a transmission interval of the original SPS configuration is T TTIs, a transmission interval of the new SPS configuration is set to T TTIs, a size of data to be transmitted through each of the N base stations in the new SPS configuration is inversely proportional to a channel congestion of each of the N base stations, N is an integer greater than or equal to 2, and T is an integer greater than or equal to 1.

11. A first communication node located in a vehicle, in a communication system supporting Vehicle-to-Everything (V2X) communication, the first communication node comprising:

processor;

transceiver transmitting and receiving a signal according to control of the processor; and memory storing one or more instructions which are executed by the processor;

wherein the one or more instructions are configured to:

perform V2X communication with a second communication node using an original resource according to an original Semi-Persistent Scheduling (SPS) configuration set by a serving base station;

when a congestion level in the original resource is greater than or equal to a predetermined threshold and at least one target base station supporting the V2X communication is discovered, transmit user equipment (UE) assistance information including at least one identifier of the at least one target base station to the serving base station;

receive, from the serving base station, a message including a new SPS configuration to be applied to the serving base station and the at least one target base station;

perform a message transmission and reception procedure with the at least one target base station for delivery of the new SPS configuration; and perform the V2X communication with the second communication node using a first resource scheduled by the serving base station based on the new SPS configuration and a second resource scheduled by the at least one target base station based on the new SPS configuration.

12. The first communication node according to claim 11, wherein the UE assistance information further includes an indicator requesting load distribution using the at least one target base station.

13. The first communication node according to claim 11, wherein the message including a new SPS configuration is a radio resource control (RRC) connection reconfiguration message.

14. The first communication node according to claim 11, wherein, in the message transmission and reception procedure, the one or more instructions are configured to:

transmit, to the at least one target base station, an RRC connection request message requesting a connection for applying the new SPS configuration;

receive an RRC connection setup message from the at least one target base station, the RRC connection setup message being a response to the RRC connection request message;

transmit an RRC connection setup complete message including an identifier of the serving base station and the new SPS configuration to the at least one target base station when a connection establishment between the first communication node and the at least one target base station is completed; and receive, from the at least one target base station, an RRC connection reconfiguration message indicating an application of the new SPS configuration.

15. The first communication node according to claim 11, wherein, in the message transmission and reception procedure, the one or more instructions are configured to:

transmit, to the at least one target base station, UE assistance information including an indicator requesting application of the new SPS configuration, an identifier of the serving base station, and the new SPS configuration; and receive, from the at least one target base station, an RRC connection reconfiguration message indicating an application of the new SPS configuration.

16. The first communication node according to claim 11, wherein a radio access technology (RAT) supported by the serving base station is different from a RAT supported by the at least one target base station.

17. The first communication node according to claim 11, wherein, when a sum of a number of serving base stations and a number of the at least one target base station is N and a transmission interval of the original SPS configuration is T transmission time intervals (TTIs), a transmission interval of the new SPS configuration is set to Nx T TTIs, N is an integer greater than or equal to 2, and T is an integer greater than or equal to 1.

18. The first communication node according to claim 17, wherein an offset between transmission intervals of the N base stations is set to T TTIs in the new SPS configuration.

19. The first communication node according to claim 11, wherein, when a sum of a number of serving base stations and a number of the at least one target base station is N and a transmission interval of the original SPS configuration is T TTIs, a transmission interval of the new SPS configuration is set to T TTIs, a size of data to be transmitted through each of the N base stations in the new SPS configuration equals (a size of total data to be transmitted to the second communication node)/N, N is an integer greater than or equal to 2, and T is an integer greater than or equal to 1.

20. The first communication node according to claim 11, wherein, when a sum of a number of serving base stations and a number of the at least one target base station is N and a transmission interval of the original SPS configuration is T TTIs, a transmission interval of the new SPS configuration is set to T TTIs, a size of data to be transmitted through each of the N base stations in the new SPS configuration is inversely proportional to a channel congestion of each of the N base stations, N is an integer greater than or equal to 2, and T is an integer greater than or equal to 1.

21. An operation method of a first communication node located in a vehicle, in a communication system supporting Vehicle-to-Everything (V2X) communication, the operation method comprising:

performing V2X communication with a second communication node using an original resource according to an original Semi-Persistent Scheduling (SPS) configuration set by a first base station;

receiving, from the first base station, a message including a new SPS configuration to be applied to the first base station and at least one second base station which is connected to the first communication node; and performing the V2X communication with the second communication node using a first resource scheduled by the first base station connected to the first communication node based on the new SPS configuration instead of the original SPS configuration and a second resource scheduled by the at least one second base station connected to the first communication node based on the new SPS configuration instead of the original SPS configuration.

22. The operation method according to claim 21, wherein the message including a new SPS configuration is a radio resource control (RRC) connection reconfiguration message.

23. The operation method according to claim 21, wherein a radio access technology (RAT) supported by the first base station is different from a RAT supported by the at least one second base station.

24. The operation method according to claim 21, wherein, when a sum of a number of first base stations and a number of the at least one second base station is N and a transmission interval of the original SPS configuration is T transmission time intervals (TTIs), a transmission interval of the new SPS configuration is set to N×T TTIs, N is an integer greater than or equal to 2, and T is an integer greater than or equal to 1.

25. The operation method according to claim 24, wherein an offset between transmission intervals of the N base stations is set to T TTIs in the new SPS configuration.

26. The operation method according to claim 21, wherein, when a sum of a number of first base stations and a number of the at least one second base station is N and a transmission interval of the original SPS configuration is T TTIs, a transmission interval of the new SPS configuration is set to T TTIs, a size of data to be transmitted through each of the N base stations in the new SPS configuration equals (a size of total data to be transmitted to the second communication node)/N, N is an integer greater than or equal to 2, and T is an integer greater than or equal to 1.

27. The operation method according to claim 21, wherein, when a sum of a number of first base stations and a number of the at least one second base station is N and a transmission interval of the original SPS configuration is T TTIs, a transmission interval of the new SPS configuration is set to T TTIs, a size of data to be transmitted through each of the N base stations in the new SPS configuration is inversely proportional to a channel congestion of each of the N base stations, N is an integer greater than or equal to 2, and T is an integer greater than or equal to 1.

28. A first communication node located in a vehicle, in a communication system supporting Vehicle-to-Everything (V2X) communication, the first communication node comprising:
  processor;
  transceiver transmitting and receiving a signal according to control of the processor; and
  memory storing one or more instructions which are executed by the processor;
  wherein the one or more instructions are configured to:
  perform V2X communication with a second communication node using an original resource according to an original Semi-Persistent Scheduling (SPS) configuration set by a first base station;
  receive, from the first base station, a message including a new SPS configuration to be applied to the first base station and at least one second base station which is connected to the first communication node; and
  perform the V2X communication with the second communication node using a first resource scheduled by the first base station connected to the first communication node based on the new SPS configuration instead of the original SPS configuration and a second resource scheduled by the at least one second base station connected to the first communication node based on the new SPS configuration instead of the original SPS configuration.

29. The first communication node according to claim 28, wherein, when a sum of a number of first base stations and a number of the at least one second base station is N and a transmission interval of the original SPS configuration is T transmission time intervals (TTIs), a transmission interval of the new SPS configuration is set to N×T TTIs, N is an integer greater than or equal to 2, and T is an integer greater than or equal to 1.

30. The first communication node according to claim 28, wherein, when a sum of a number of first base stations and a number of the at least one second base station is N and a transmission interval of the original SPS configuration is T TTIs, a transmission interval of the new SPS configuration is set to T TTIs, a size of data to be transmitted through each of the N base stations in the new SPS configuration equals (a size of total data to be transmitted to the second communication node)/N, N is an integer greater than or equal to 2, and T is an integer greater than or equal to 1.

31. The first communication node according to claim 28, wherein, when a sum of a number of first base stations and a number of the at least one second base station is N and a transmission interval of the original SPS configuration is T TTIs, a transmission interval of the new SPS configuration is set to T TTIs, a size of data to be transmitted through each of the N base stations in the new SPS configuration is inversely proportional to a channel congestion of each of the N base stations, N is an integer greater than or equal to 2, and T is an integer greater than or equal to 1.

* * * * *